Jan. 28, 1936.  C. J. LESTER  2,029,111
DEVICE FOR MEASURING AND INDICATING TENSION ON CABLES
Filed April 22, 1935  2 Sheets-Sheet 1
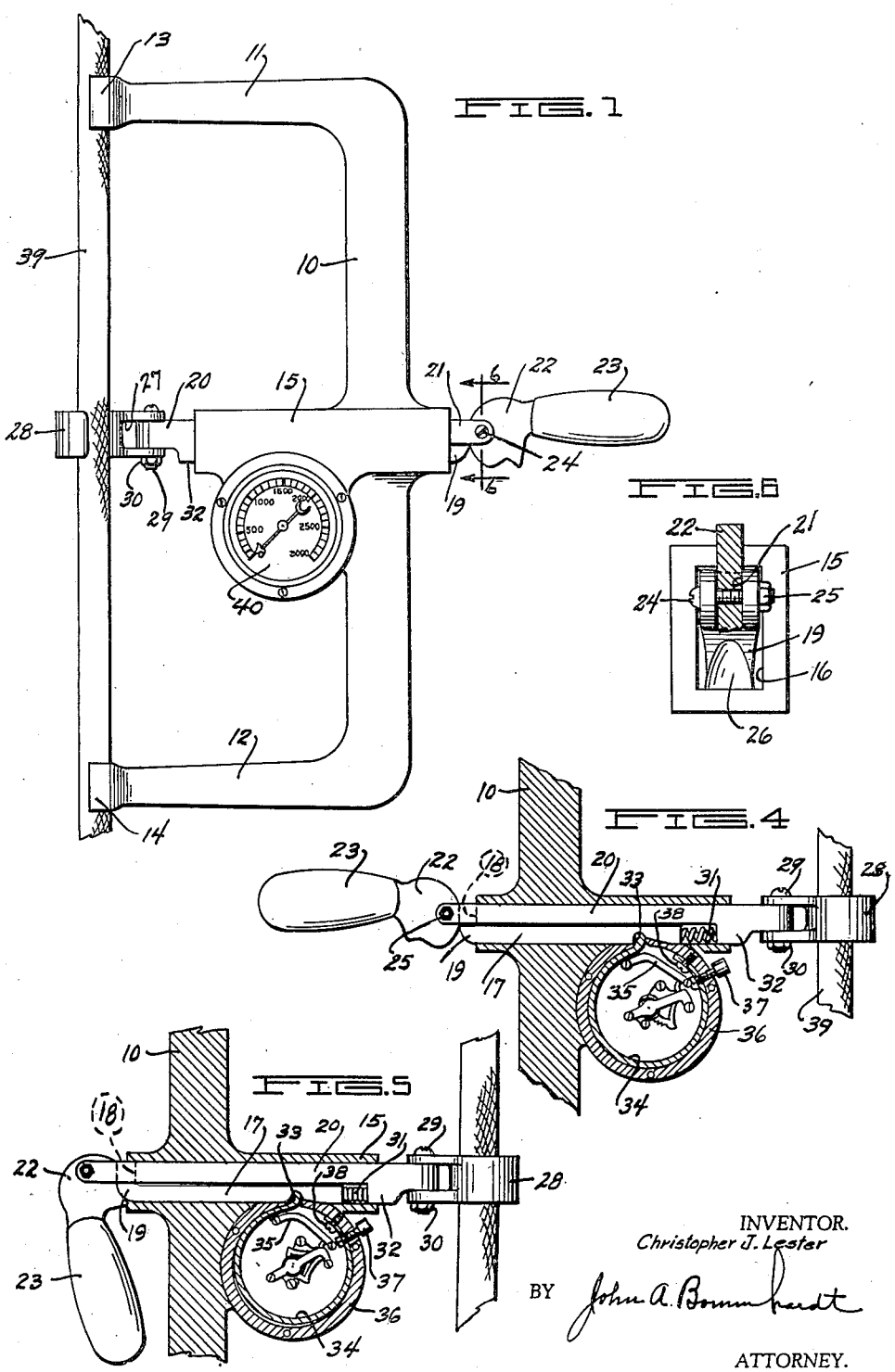
INVENTOR.
Christopher J. Lester
BY John A. Bommhardt
ATTORNEY.

Jan. 28, 1936.  C. J. LESTER  2,029,111
DEVICE FOR MEASURING AND INDICATING TENSION ON CABLES
Filed April 22, 1935  2 Sheets-Sheet 2
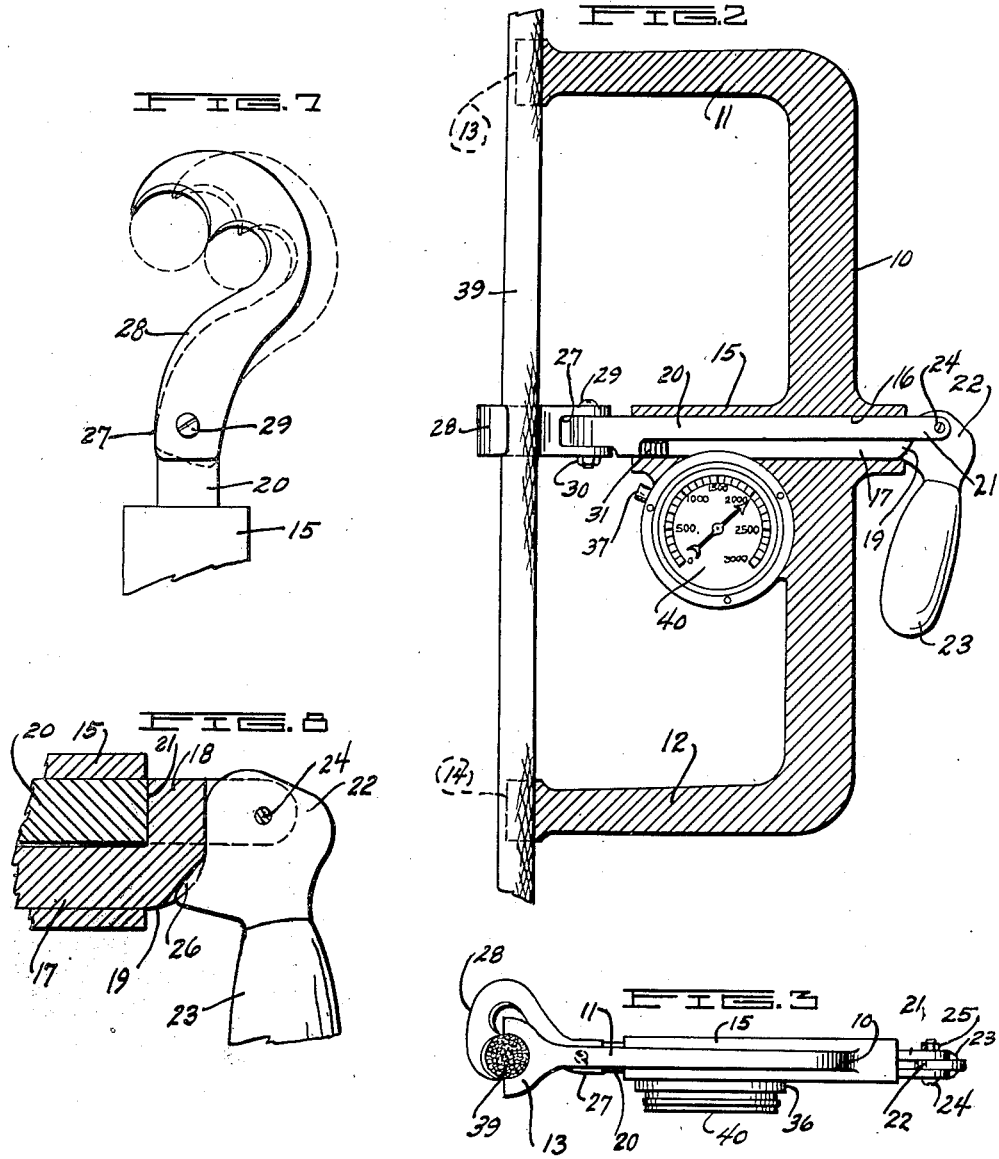
INVENTOR.
Christopher J. Lester
BY
ATTORNEY.

Patented Jan. 28, 1936

2,029,111

UNITED STATES PATENT OFFICE 2,029,111

DEVICE FOR MEASURING AND INDICATING TENSION ON CABLES

Christopher J. Lester, Cleveland, Ohio

Application April 22, 1935, Serial No. 17,557

3 Claims. (Cl. 265—1)

This invention relates to a device for measuring and indicating tension on cables, particularly the cables or ropes of elevator hoists.

It is desirable, particularly in elevator work, to know the amount of tension on the hoisting cables, for the purpose of equalizing the same and permitting any adjustment necessary where a plurality of cables are used.

The present invention has for one of its objects to provide a simple and convenient apparatus or gage which may be used for this purpose, altho obviously it will be capable of use in any relation where the tension on a rope or cable is to be measured or indicated.

One form of the invention is illustrated in the accompanying drawings in which:

Fig. 1 is a front elevation of a tension checking device for use on elevator hoist ropes.

Fig. 2 is a view similar to Fig. 1 but with the frame structure in section.

Fig. 3 is a top plan view of Fig. 1.

Fig. 4 is a fragmentary sectional view of the tension checking mechanism in operative position.

Fig. 5 is a similar view to Fig. 4, but with the tension checking mechanism in operative position.

Fig. 6 is a section taken on lines 6—6 of Fig. 1.

Fig. 7 is an enlarged top plan view of the hook showing the position of the hook for different sizes of cables.

Fig. 8 is an enlarged fragmentary section of the tension and push bars with the cam handle in operative position.

Referring particularly to the drawings, 10 indicates a yoke shaped frame having a pair of arms 11 and 12 at opposite ends, said arms terminating in forks 13 and 14 respectively.

At or about the middle of the frame it has a tubular extension or body 15, projecting substantially parallel to the arms 11 and 12, and in the hollow or bore 16 of this extension is slidably mounted a push bar 17, having a lug 18 projecting from its inner end 19. A tension bar 20 is also slidably mounted within the hollow 16 of the body 15, beside the push bar 17, and the rear end of said tension bar is split or forked as indicated at 21 to receive the cam head 22 having a handle 23, the cam handle being pivoted at 24 by a bolt and nut 25. The rear end of the push bar 17 may be slightly notched as at 26 to receive the cam head when turned down, as indicated in Fig. 8.

The inner or front end of the tension bar 20 is mounted between the forks 27 of a hook 28 to which it is secured by a pivot pin 29 which may have a lock nut 30. The hook is of such shape as to engage behind or around the rope or cable 39, and as shown in Fig. 7 the hook may have different recesses to engage cables of different sizes.

A spring 31 is mounted in compression between the inner end of the push bar 17 and the shoulder 32 near the front of the tension bar 20, and such spring is compressed by relatively opposite lengthwise movement of the push bar and tension bar.

A notch 33 near the inner end of the push bar 17 receives the free end of a gage spring 34, the said free end of the gage spring being connected to a standard gage movement by a link 35. The fixed end of the gage spring 34 is secured to the inner surface of the gage casing 36 by a screw 38 and a screw 37, in a well known manner. The gage casing 36 is rigidly secured to the adjacent parts of the frame 10 and body 15, and a gage dial 40 cooperates with the usual pointer to indicate movement of the pointer, and may be calibrated in pounds of tension of the cable, altho this is not necessarily so as primarly the device will be used to determine whether different cables have equal tension.

In use, the instrument is mounted on the cable to be tested by lifting the cam handle to horizontal or off position, as shown in Fig. 1, and the forks 13 and 14 are then placed against the cable. The middle hook 28 is then swung in to engage the opposite side of the cable and the cam handle is then swung down until it stops in the notch 26, as shown in Figs. 2 and 8. In this position the device clamps itself on the cable and indicates the tension thereon. When the handle 23 is pulled down the rise of the cam tends to draw the tension bar 20 rearwardly and forces the push bar 17 forwardly, compressing the spring 31, and the movement of the push bar is communicated to the free end of the gage movement according to the amount of tension or pressure required, and this movement being transmitted to the gage pointer indicates on the gage the amount of the deflection of the cable, which is proportional to the load or tension on the cable being tested.

By applying the device to the various cables the tension will be indicated and they can then be adjusted or equalized accordingly.

The invention is not limited to the particular form shown. Various changes can be made within the scope of the following claims.

I claim:

1. In an instrument of the kind described, the combination of a yoke frame having arms which may be applied to one side of a cable at spaced points, a guide mounted on the frame, a tension rod slidable in the guide and provided with a hook for engaging the opposite side of the cable between the arms, a pressure bar slidable in the guide, a cam handle connected to the tension rod and bearing against the pressure bar, and a gage including a spring resisting the movement of the pressure bar and operatively connected to the pressure bar to indicate the movement thereof.

2. In an instrument of the kind described, the combination of a yoke frame having arms at opposite ends arranged to be applied to one side of a cable at spaced points, a tension rod slidably mounted on the frame between the arms and carrying means to engage the cable between the points of engagement of the arms, a pressure bar slidable on the frame beside the tension rod, a spring in compression between the tension rod and the pressure bar and tending to resist relative movement thereof, a cam operatively connected between the rod and the pressure bar to apply tension to the former and pressure to the latter, and a force measuring gage supported on the frame and operatively connected to the pressure bar.

3. The combination stated in claim 2, the means carried by the tension rod to engage the cable comprising a hook pivoted to the tension rod and having a plurality of cable receiving recesses.

CHRISTOPHER J. LESTER.